United States Patent
Ohnuki et al.

[11] Patent Number: 5,803,617
[45] Date of Patent: Sep. 8, 1998

[54] ROLLING BEARING UNIT WITH SEAL DEVICE

[75] Inventors: Yoshihisa Ohnuki; Hiroya Miyazaki; Hiroaki Sasa, all of Fujisawa, Japan

[73] Assignee: NSK Ltd., Tokyo, Japan

[21] Appl. No.: 803,025

[22] Filed: Feb. 19, 1997

[30] Foreign Application Priority Data

Feb. 23, 1996 [JP] Japan ........................................ 8-36802
Feb. 2, 1997 [JP] Japan ........................................ 9-22303

[51] Int. Cl.$^6$ ........................................ F16C 33/78
[52] U.S. Cl. ........................................ 384/486; 384/544
[58] Field of Search ........................................ 384/486, 485, 384/484, 477, 544, 589

[56] References Cited

U.S. PATENT DOCUMENTS

| | | | |
|---|---|---|---|
| 3,944,305 | 3/1976 | Asberg | 384/485 X |
| 4,789,252 | 12/1988 | Dreschmann et al. | 384/486 |
| 5,458,352 | 10/1995 | Lederman | 384/544 X |

FOREIGN PATENT DOCUMENTS

| | | |
|---|---|---|
| 0 706 002 | 4/1996 | European Pat. Off. . |
| 49-112052 | 10/1974 | Japan . |
| 63-11929 | 1/1988 | Japan . |
| 8-10703 | 7/1992 | Japan . |
| 7-34224 | 6/1995 | Japan . |
| 7-34225 | 6/1995 | Japan . |
| 7-34226 | 6/1995 | Japan . |
| 1 548 622 | 7/1979 | United Kingdom . |
| 2 165 594 | 4/1986 | United Kingdom . |

*Primary Examiner*—Thomas R. Hannon
*Attorney, Agent, or Firm*—Evenson, McKeown, Edwards & Lenahan, P.L.L.C.

[57] ABSTRACT

A rolling bearing unit with seal device comprises an outer ring member having an inner peripheral surface formed with outer ring raceways in double rows, an inner ring assembly having an outer peripheral surface formed with inner ring raceways in double rows opposed to the outer ring raceways and having an outward flange projected from the open end portion of the outer ring member, a plurality of rolling elements provided between the outer ring raceways and the inner ring raceways, respectively, and a seal ring for covering an annular space between the outer ring member and the inner ring assembly and comprising a reinforcing metal, a first side seal lip on the radially outer side having a tip edge in sliding contact relation with a side face of the outward flange, a second side seal lip on the radially inner side having a tip edge in sliding contact relation with a tip edge in sliding contact with a curved surface portion through which the side face is continued to the outer peripheral surface of the inner ring assembly, and a radial seal lip having a tip edge in sliding contact relation with the outer peripheral surface of the inner ring assembly, such that the thickness of the side seal lip on the radially inner side is smaller than the thickness of the side seal lip on the radially outer side.

5 Claims, 6 Drawing Sheets

ROLLING BEARING UNIT WITH SEAL DEVICE

BACKGROUND OF THE INVENTION

1. Field of the Invention

The present invention is related to a rolling bearing unit with seal device which is used to rotatably support a vehicle wheel with reference to a suspension apparatus.

2. Description of the Related Art

FIG. 1 shows a construction of one embodiment of the present invention for the rolling bearing unit to support a vehicle wheel with reference to a suspension apparatus.

The rolling bearing unit comprises an inner ring assembly of an inner ring element 1 and a hub 2. The hub 2 has an axially outer end portion (the left end portion in FIG. 1) having an outer peripheral surface formed with an outward flange 3 to fix a vehicle wheel, an intermediate portion having an outer peripheral surface formed with a first inner ring raceway 4a and a step portion 5. The inner ring element 1 has an outer peripheral surface formed with a second inner ring raceway 4b, and is fitted onto an outer peripheral surface of the hub 2 on the axially inner side (the right side in FIG. 1) with the axially outer end face (the left end face in FIG. 1) abutted to the step portion 5.

The hub 2 is formed with a male threaded portion 6 on its axially inner side, and a nut 7 is screwed on the male threaded portion 6. The inner ring element 1 is fixed to the outer peripheral surface of the hub 2 at a predetermined portion by clamping the nut 7 to the male threaded portion 6.

Provided about the hub 2 is an outer ring 8 which has an intermediate portion on the outer peripheral surface of which an outwardly flanged mount portion 9 is provided to fix the outer ring 8 with reference to the suspension apparatus.

Provided on the inner peripheral surface of the outer ring 8 are first and second outer ring raceways 10a, 10b which are faced to the inner ring raceways 4a, 4b, respectively.

Provided between the inner ring raceways 4a, 4b and the outer ring raceways 10a, 10b are a plurality of rolling elements 11 to freely rotate the hub 2 inside the outer ring 8, respectively. A cage or retainer 12 is provided to rotatably support each row of rolling elements 11.

Provided between the inner peripheral surface of the axially outer end portion of the outer ring 8 and the outer peripheral surface of the hub 2 is a seal ring 13 to cover the axially outer opening portion of the space 15 where the rolling elements 11 are disposed between the inner peripheral surface of the outer ring 8 and the outer peripheral surfaces of the hub 2 and the inner ring element 1. The opening portion of the axially inner end (right end in FIG. 1) of the outer ring 8 is covered by a cover 14 to prevent dust, rain water etc. from entering the space 15 therethrough, and grease from leaking out of the space 15 in which the grease is filled.

In order to prevent foreign matter from entering the space 15 and grease from leaking out of the space 15, sealing performance must be secured in the seal ring 13. As disclosed in Japanese Utility Model Publication KOKAI No. H7-34224, a seal ring 13a is shown in FIG. 6 to achieve the purpose as mentioned above. The seal ring 13a is comprises of a reinforcing metal 16 and a seal member 17 formed in a circular ring shape, respectively. The reinforcing metal 16 is made from a metal plate and fitted into the axially outer end portion of the outer ring 8. The seal member 17 is made from a resilient material, and fixed to the reinforcing metal 16 by way of thermal bonding etc. The seal member 17 is provided with two side seal lips 18, 19, on the radially outer and inner sides, and a single radial seal lip 20. The two side seal lips 18, 19 are generally tilted such that the closer to its tip edge (left end edge in FIG. 6), the further the lip extends outwardly in the radial direction (upward in FIG. 6), thereby securing the performance to prevent the foreign matter from entering the space 15. The radial seal lip 20 is also tilted such that the closer to its tip edge (the right lower edge in FIG. 6), the further the lip extends radially inwardly in the space 15 (right in FIG. 6), thereby securing the performance to prevent the grease from leaking out of the space 15.

There are some problems in the conventional rolling bearing unit with seal device which has the seal ring 13a incorporated in it as shown in FIG. 6.

First, since the two side seal lips 18, 19 on the radially outer and inner sides are made in the same shape, the torque to rotate the hub 2 must be increased to achieve enough sealing performance, so that the operating performance and fuel performance are worsened in the vehicle in which the rolling bearing unit with seal device is incorporated.

In other words, the rigidity of the side seal lips 18, 19, specifically the rigidity of the radially outer, side seal lip 18 directly exposed to the foreign substances must be increased to secure the seal performance, so that the tip edge of the radially outer, side seal lip 18 is abutted to the side face of the outward flange 3 under a high contact pressure. However, in the conventional structure as shown in FIG. 6, since the two side seal lips 18, 19 are formed substantially in the same shape, not only the contact pressure between the tip edge of the radially outer, side seal lip 18 and the side face of the outward flange 3 but also the contact pressure between the radially inner, side seal lip 19 and the side face of the outward flange 3 is increased, so that the torque is excessively increased.

In the conventional structure as shown in FIG. 6, the outward flange 3 is continuous to the outer peripheral surface of the hub 2 through a curved surface portion 21, which is not placed in sliding contact relation with the tip edge of the radially inner side seal lip 19. Accordingly, as the radius of curvature of the curved surface portion 21 is small in order to secure this non-contact relationship, the rigidity and strength of the outward flange 3 is hardly secured.

On the other hand, if the radius of curvature is made larger while the tip edge of the radially inner, side seal lip 19 does not slidingly contact the curved surface 21, the diameter of the rolling bearing unit with seal device including the seal ring 13a must be enlarged.

SUMMARY OF THE INVENTION

An object of the present invention is to provide a rolling bearing unit with seal device overcoming the problems as mentioned above.

An object of the present invention is to provide a rolling bearing unit with seal device for use between an outer ring and a hub and an outward flange and having seal lips in the seal device such that at least one of the seal lips is slidingly abutted to a curved surface portion between the outer peripheral surface of the hub and the side face of the outward flange.

Another object of the present invention is to provide a rolling bearing unit with seal device having radially outer and inner side seal lips wherein the radially inner side seal lip is made thin to reduce torque.

DESCRIPTION OF THE PREFERRED EMBODIMENTS

Figure 1:
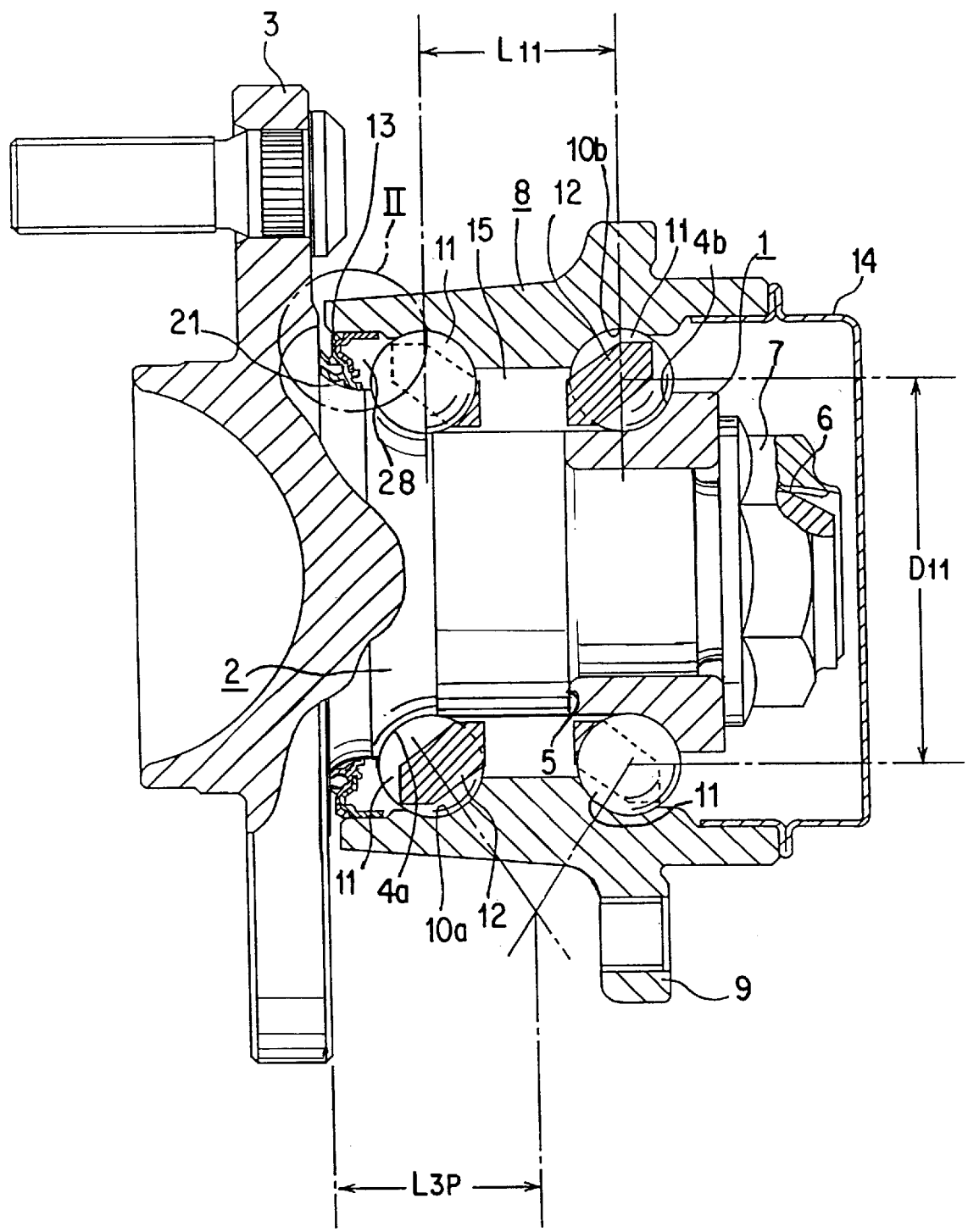
FIG. 1 is a cross sectional view of one embodiment of the rolling bearing unit with seal device according to the present invention.

According to one embodiment of the present invention, the rolling bearing unit with seal device comprises, like the conventional rolling bearing units with seal device, an outer ring member having an open end portion and an inner peripheral surface formed with outer ring raceways in double rows, an inner ring assembly having an outer peripheral surface part of which is formed with inner ring raceways in double rows opposed to the outer ring raceways with the remained portion of the outer peripheral surface projected from the open end portion of the outer ring member and formed with an outward flange, a plurality of rolling elements provided between the outer ring raceways and the inner ring raceways, respectively, and a seal ring to cover an annular space between the outer ring member and the inner ring assembly at the open end portion.

Specifically, in this embodiment, the seal ring comprises a reinforcing metal, side seal lips on the radially outer and inner sides each having a tip edge in sliding contact relation with a side face of the outward flange, or with a curved surface portion through which the side face is continued to the outer peripheral surface of the inner ring assembly, and a radial seal lip having a tip edge in sliding contact relation with the outer peripheral surface of the inner ring assembly.

In addition, the rolling bearing unit with seal device of this embodiment satisfies at least one of the following conditions (1) and (2):

(1) The thickness of the radially inner, side seal lip is smaller than the thickness of the radially outer, side seal lip.

(2) The tip edge of the radially inner, side seal lip is placed in sliding contact relation with the curved surface portion.

In addition, it is desirable that the seal ring satisfies at least one of the following conditions (3) and (4).

(3) The outer diameter of the radially outer, side seal lip in the free state is smaller than the inner diameter of the cylindrical fitting portion of the reinforcing metal of the seal ring that is fitted into and fixed to the end portion of the outer ring.

(4) The side seal lips of the seal ring as mentioned above is made from an elastic seal member, such that the seal member covers an exposed portion of the reinforcing metal of the seal ring, and such that the seal member has a portion slightly projected in the free state radially outward of the outer peripheral surface of the reinforcing metal.

The rolling bearing unit with seal device of this embodiment as constructed above has the radially inner, side seal lip which can be changed in shape, or in sliding contact position of its tip edge, thereby achieving the following performances.

(1) Since the thickness of the radially inner, side seal lip is made smaller than the thickness of the radially outer, side seal lip, the contact pressure between the tip edge of the radially inner, side seal lip and its mating face can be reduced, whereby the torque required to rotate the inner ring assembly is reduced.

(b 2) Since the tip edge of the radially inner, side seal lip is placed in contact relation with the curved surface portion, the radius of curvature of the curved surface portion can be made larger to secure the rigidity and strength of the outward flange without increasing the axial and radial sizes of the rolling bearing unit with seal device.

(3) The seal rings can be placed in series and close to each other in an axial direction by making the outer diameter of the radially outer, side seal lip in the free state smaller than the inner diameter of the cylindrical fitting portion of the reinforcing metal of the seal ring fitted into and fixed to the end portion of the outer ring, whereby the seal ring is easily packed for smooth transportation.

(4) Rain water etc. is prevented from coming to the reinforcing metal by covering part of the reinforcing metal of the seal ring exposed to outside with the elastic seal member, and by slightly projecting part of the seal member in the free state radially outward of the outer peripheral surface of the reinforcing metal. Specifically, the fitting portion between the reinforcing metal and the outer ring can be sealed by projecting the seal member radially outward.

Accordingly, the reinforcing metal which is made from an inexpensive steel plate, and not from an expensive stainless steel plate, is prevented from being rusted, thereby securing enough endurance.

Figure 2:
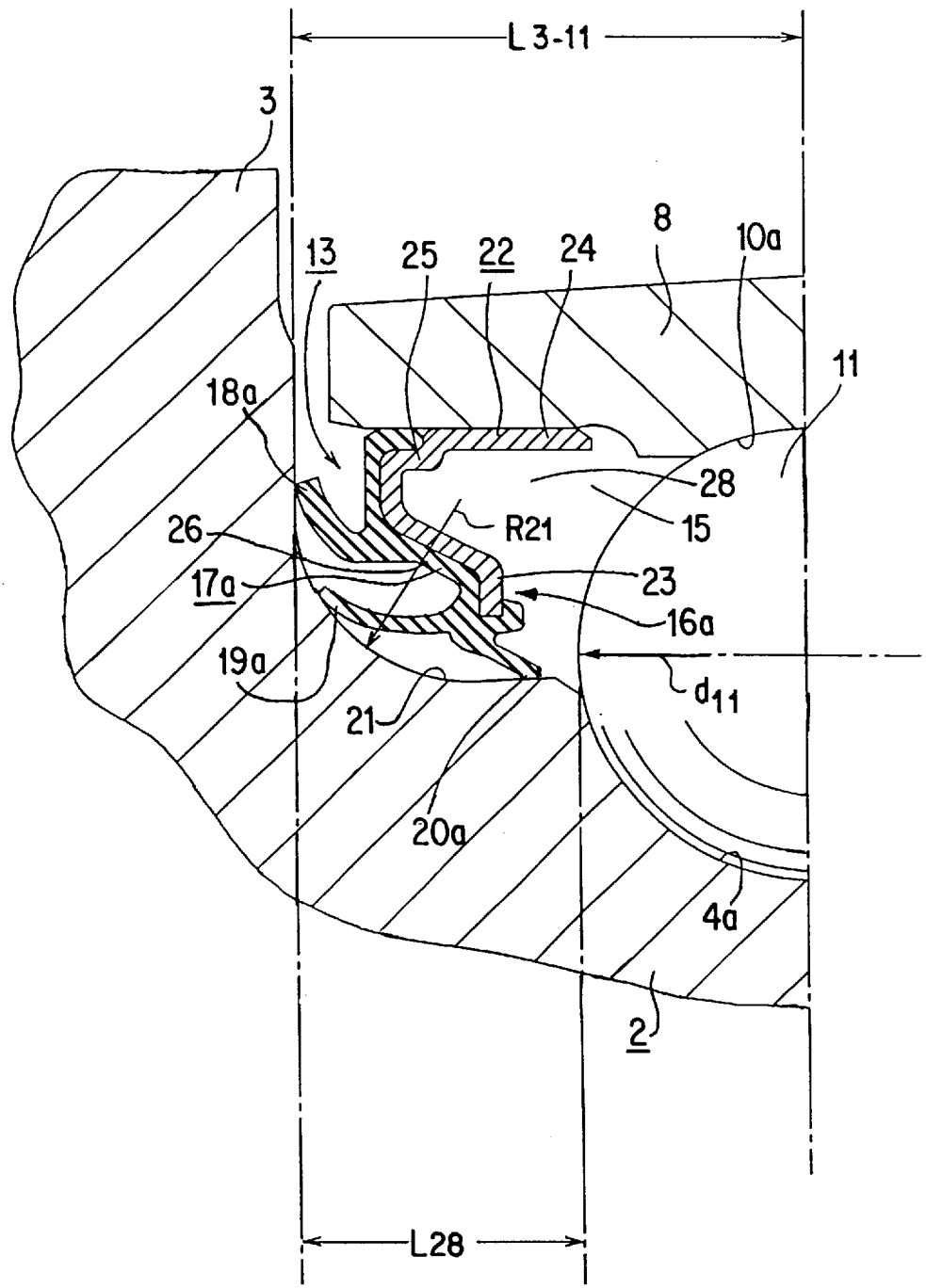
FIG. 2 is an enlarged view of Section II in FIG. 1.
Figure 3:
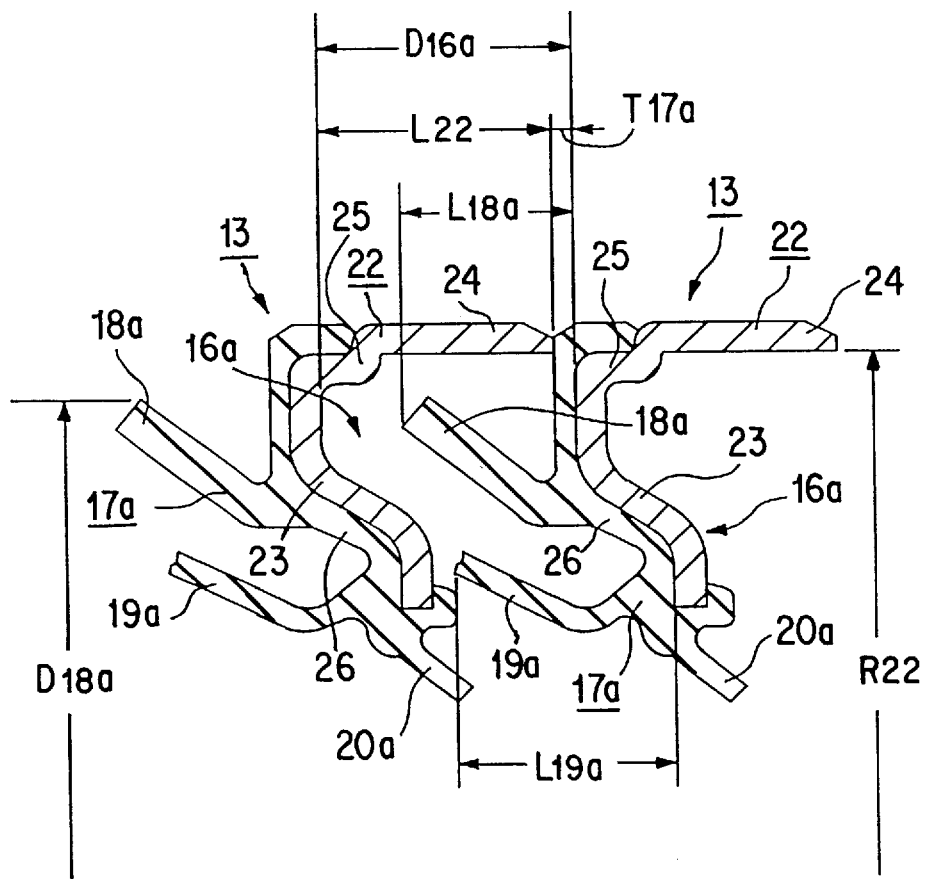
FIG. 3 is a partial cross sectional view to show seal rings arranged in series and close to each other for packaging and transporting.

FIGS. 1 to 3 show an example of a first embodiment of the rolling bearing unit with seal device according to the present invention, which satisfies all of the requirements (1) to (4) mentioned above.

Specifically, the rolling bearing unit comprises a seal ring 13 and a curved surface portion 21 which are tailored in shape so as to lower the torque in the rolling bearing unit with seal device, to secure the rigidity and strength of the outward flange, to simplify the package of the seal ring 13, and to provide the reinforcing metal 16a with anti-rusting property.

The structure of the rolling bearing unit section is substantially the same as that of the prior art structure previously mentioned, and therefore redundant desoriptions are omitted.

The following is a detailed description focussed on the characteristic portion according to the present invention.

The seal ring 13 comprises a reinforcing member 16a and a seal member 17a.

The reinforcing metal 16a of the seal ring 13 is made from a steel plate through a plastic deformation process to form a generally annular shape, and comprises a cylindrical fitting portion 22 and a support plate portion 23 bent radially inward from the axially outer end edge (left end edge in FIGS. 1 and 2) of the cylindrical fitting portion 22.

The cylindrical fitting portion 22 comprises a larger diameter portion 24 on the axially inner side (right side in FIGS. 1 and 2) and a smaller diameter portion 25 on the axially outer side (left side in FIGS. 1 and 2).

The outer diameter of the larger diameter portion 24 in the free state is slightly larger than the inner diameter of the axially outer end opening portion of the outer ring 8. Accordingly, the larger diameter portion 24 is fitted into and fixed to the axially outer end opening portion of the outer ring 8 in an interference fitting relationship. The outer diameter of the smaller diameter portion 25 is slightly smaller than the inner diameter of the axially outer opening portion of the outer ring 8.

The support plate portion 23 has a shape near to S in cross section, and tilted such that the closer to the radially inward (downward in FIG. 2) the closer to the rolling elements 11 (right in FIG. 2) in the space 15.

The seal member 17a of the seal ring 13 is made from an elastic member such as rubber and elastomer etc., and fixed to the reinforcing metal 16a by way of thermal bonding etc.

The seal member 17a has an outer peripheral edge portion to cover the outer peripheral surface of the smaller diameter portion 25. Specifically, the seal member 17a has a portion for covering the outer peripheral surface of the smaller diameter portion 25 such that the outer diameter of that portion in the free state is slightly larger than the inner diameter of the axially outer end opening portion of the outer ring 8. Accordingly, in the state where the larger diameter portion 24 is fitted into the axially outer end portion of the outer ring 8, the portion of the seal member 17a for covering the outer peripheral surface of the smaller diameter portion 25 is elastically pressed to the outer peripheral surface of the smaller diameter portion 25 and to the inner peripheral surface of the axially outer end opening portion of the outer ring 8 to be secured between the reinforcing metal 16a and the outer ring 8 for positive seal performance.

The seal member 17a has a base portion 26 to cover the axially outer side face of the support plate portion 23 in the whole circumference thereof.

The seal member 17a has side seal lips 18a, 19a and a single radial seal lip 20a. The side seal lip 18a is formed on a radially outer portion of the axially outer face of the base portion 26 while the side seal lip 19a is formed on a radially inner portion of the axially outer face of the base portion 26. The radial seal lip 20a is formed on the inner peripheral edge of the base portion 26.

The radially outer, side seal lip 18a on the radially outer side has a tip end edge (left end edge in FIGS. 1 and 2) which is slidably abutted to the side face of the outward flange 3, formed on the outer peripheral surface of the hub 2, specifically to a portion of the side face radially outer than the curved surface portion 21 for continuous connection between the side face of the outward flange 3 and the outer peripheral surface of the hub 2.

The radially inner, side seal lip 19a formed on the radially inner side has a top end edge (left end edge in FIGS. 1 and 2) which is slidably abutted to the curved surface portion 21.

The thickness of the radially inner, side seal lip 19a is smaller than that of the radially outer, side seal lip 18a. Accordingly, the rigidity of the radially inner, side seal lip 19a is lower than that of the radially outer, side seal lip 18a, and the contact pressure between the tip end edge of the side seal lip 19a on the radially inner side and the curved surface portion 21 is lower than that between the tip end edge of the side seal lip 18a on the radially outer side and the side face of the outward flange 3.

Both of the side seal lips 18a, 19a are inclined such that the closer to the tip end edge, the further the lip extends outwardly in the radial direction in this embodiment.

There is no need of such inclination, however, in the side seal lip 19a on the radially inner side which is slidably abutted to the curved surface portion 21.

The radial seal lip 20a is slidably abutted to a portion of the outer peripheral surface of the hub 2 between the curved surface portion 21 and the inner ring raceway 4a. The radial seal lip 20a is inclined such that the farther it extends in the radial direction (lower in FIG. 2), the closer the lip comes to the inner ring raceway 4a (right side in FIG. 2). The outer diameter of the radially outer, side seal lip 18a in the free state is smaller than the inner diameter of the cylindrical fitting portion 22 of the reinforcing metal 16a.

In the rolling bearing unit with seal device, according to the present invention, the thickness of the radially inner, side seal lip 19a is smaller than that of the radially outer, side seal lip 18a, and therefore the contact pressure between the tip end edge of the radially inner, side seal lip 19a and the mating curved surface portion 21 is lower. As the contact pressure is reduced, the torque to rotate the hub 2 of the inner ring assembly, is reduced.

Foreign matter is prevented from entering the space 15 substantially by the radially outer, side seal lip 18a which is directly opposed to the ambient space in which the foreign matter exists.

The radially inner, side seal lip 19a prevents the penetration of only a small amount of foreign matter which has leaked through the sliding contact portion between the radially outer, side seal lip 18a and the side face of the outward flange 3.

Accordingly, even if the contact pressure between the tip end edge of the radially inner, side seal lip 19a and the curved surface portion 21 is lowered, the seal performance of the side seal lips 18a, 19a on the radially outer and inner sides is sufficiently secured.

In order that the seal performance is secured while the torque is reduced, the sliding contact surface to which the tip end edge of the radially outer and/or inner, side seal lips 18a, 19a are abutted, that is surfaces of the side face of the outward flange and/or curved surface portion 21, is desirably controlled in roughness, specifically about 0.5 a.

In addition, the radially inner, side seal lip 19a is longer than the radially outer, side seal lip 18a, so that the rigidity of the radially inner, side seal lip 19a is further lowered, thereby further lowering the torque.

Since the sip end edge of the radially inner, side seal lip 19a is slidably abutted to the curved surface portion 21, it is possible to provide the curved surface portion 21 with a larger radius of curvature in cross section even if the axial size (left and right direction in FIGS. 1 and 2) and the radial size (up and down direction in FIGS. 1 and 2) of the rolling bearing unit with seal device are not larger.

With the larger radius of curvature in cross section of the curved surface portion 21, the rigidity and strength of the outward flange 3 are secured. For example, in the case of the rolling bearing unit of usual automobiles, and radius $R_{21}$ of curvature (FIG. 2) in cross section of the curved surface portion 21 must be at least 3 mm, preferably at least 4–5 mm.

As in the present invention, the tip end edge of the radially inner, side seal lip 19a is slidably abutted to the curved surface portion 21, and therefore it is possible that the radius $R_{21}$ of curvature in cross section of the curved surface portion 21 is at least 3 mm, and even at least 4–5 mm.

The outer diameter $D_{18}$ (FIG. 3) in the free state of the radially outer, side seal lip 18a is smaller than the inner diameter $R_{22}$ (FIG. 3) of the cylindrical fitting portion 22 fitted into the end portion of the outer ring 8 ($D_{18}<D_{22}$), and therefore as shown in FIG. 3, a plurality of seal rings 13 can be axially arranged in series and close to each other.

When seal manufactures ship the seal rings 13 to bearing manufactures to install the seal rings 13 in the rolling bearing units, the seal rings must be packed in a package. When the seal rings 13 formed as in FIGS. 1 to 3 are axially in series and close to each other, the radially outer, side seal lip 18a extends inside the cylindrical fitting portion 22, and therefore the whole axial size of the axially combined, seal rings 13 is not so large. Accordingly, the packaging of the seal rings 13 is easy, and their shipping and transporting are efficient.

With the seal lips 13 axially arranged in series and close to each other, the radially outer and inner seal lips 18a, 19a are kept in the free state to prevent the seal lips 18a, 19a from being deformed. This is achieved, in addition to the condition of $D_{18a}<R_{22}$, the radially outer and inner seal lips 18a, 19a are controlled in size as follows:

The distances $L_{18a}$ and $L_{19a}$ from the axially outer face (left face in FIG. 3) of the reinforcing metal 16a to the tip end edges of the radially outer and inner seal lips 18a, 19a are smaller than the distance or pitch $D_{16a}$ between the reinforcing metals 16a of the seal rings 13 arranged in series and close to each other ($L_{18a}<D_{16a}$, $L_{19a}<D_{16a}$).

It will be noted that the distance or pitch $D_{16a}$ between the reinforcing metals 16a of the seal rings 13 arranged in series and close to each other is equal to the sum of the axial length $L_{22}$ of the cylindrical fitting portion 22 of the reinforcing metal 16a and the thickness $T_{17a}$ of the part of the seal member 17a covering the outside surface of the reinforcing metal 16a ($D_{16a}=L_{22}+T_{17a}$).

In the structure of the present embodiment, the seal ring 13 has the reinforcing metal 16a which has the support plate portion 23, and the axially outer surface of the support plate portion 23 is generally covered by the seal member 17a. In addition, the seal member 17a has the outer peripheral portion held between the outer peripheral surface of the smaller diameter portion 25 and the inner peripheral surface of the open end portion of the outer ring 8. Accordingly, the fitting portion between the reinforcing metal 16a and the outer ring 8 is sealed to prevent rain water etc. from reaching the reinforcing metal 16a.

Accordingly, the reinforcing metal 16a made from an inexpensive steel plate such as SPCC, and not from an expensive steel plate such as stainless steel, can be prevented from being rusted, thereby securing sufficient endurance.

The outer diameter in the free state of the portion of the seal member 17a covering the smaller diameter portion 25 is larger by 0.3–1.0 mm than the outer diameter in the free state of the larger diameter portion 24. Due to this controlled relationship between the outer diameters, the seal device can be easily mounted to the outer ring 8 while the penetration of rain water etc. is securely prevented.

When applying the seal device of the present invention to an actual rolling bearing unit for automobile, the axial size $L_{28}$ (FIG. 2) of the annular space 28 in which the seal ring 13 is mounted is desirably about 6.5 mm to about 9.5 mm, whereby the rigidity of the rolling bearing unit with seal device is increased and the maneuvability of the automobile using the bearing unit is securely stabilized.

Specifically, there are some methods to increase the rigidity of the rolling bearing unit having rolling elements 11 in double rows as follows:

(1) The preload to the rolling elements is increased.

(2) The diameter of pitch circle $D_{11}$ (FIG. 1) of the rolling elements is enlarged.

(3) The distance $L_{11}$ (FIG. 1) between the centers of the rolling elements is increased.

(4) The distance $L_{3P}$ (FIG. 1) from the cross point P of the load operation lines of the rolling elements 11 in double rows to the outward flange 3 is increased.

Method (1) is generally known in the art to increase the rigidity of bearings, and can be used in a manner independent from the present invention. Methods (2) and (3) are also generally known in the art and can be used in a manner independent from the present invention in an allowable range.

Method (4) can be used to increase the bending rigidity of the hub 2 with the outward flange 3 so that the rigidity of the rolling bearing unit for supporting a vehicle wheel.

When adopting the method (4), the distance $L_{3-11}$ (FIG. 2) between the side face portion of the outward flange 3 to which the tip end edge of the radially outer, side seal lip 18a is slidably abutted, and the center of the rolling elements 11 opposed to the side face of the outward flange 3 must be small.

In addition, the distance $L_{3-11}$ is controlled by the diameter $d_{11}$ (FIG. 2) of the rolling elements 11 and the axial size $L_{28}$ of the annular space 28 in which the seal ring 13 is mounted. The diameter $d_{11}$ of the rolling elements 11 is determined based on the rolling fatigue life required in the rolling bearing unit. Taking these conditions into consideration, the axial size $L_{28}$ of the annular space 28 in which the seal ring 13 is mounted is determined, that is from 6.5 mm to 9.5 mm, so that the bending rigidity of the hub 2 of the rolling bearing unit with seal device is secured.

In the case where the rolling elements 11 are ball as in the figures, the axial size $L_{28}$ of the annular space 28 is defined by the distance $L_{3-11}$ between the side face portion of the outward flange 3 to which the tip end edge of the radially outer, side seal lip 18a is abutted and the center of the rolling elements 11 opposed to the side face of the outward flange 3, and by a half of the outer diameter $d_{11}$ of the rolling elements, specifically $L_{3-11}$ minus $½·d_{11}$ ($L_{3-11}-½·d_{11}$).

Figure 4:
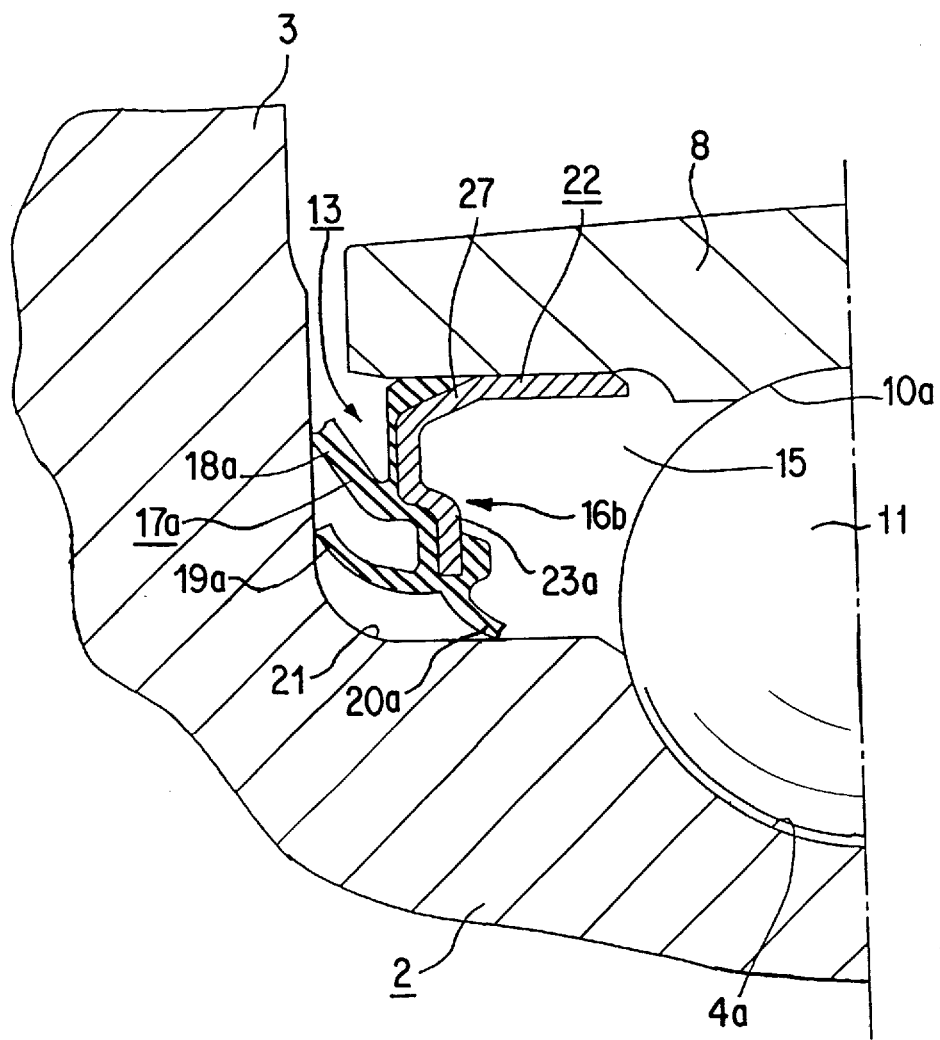
FIG. 4 is an enlarged view similar to FIG. 2 showing another embodiment of the present invention.

FIG. 4 shows a second example of the present embodiment. The present example satisfies the requirements (1), (3), and (4) mentioned above, except for requirement (2).

Specifically, the thickness of the radially inner, side seal lip 19a is smaller than that of the radially outer, side seal lip 18a so as to decrease the contact pressure of the tip end edge of the radially inner, side seal lip 19a onto the mating side face of the outward flange 3 (right side face of FIG. 4), whereby the torque required to rotate the hub 2 of the inner ring assembly is lowered.

The torque can be further lowered by making the radially inner, side seal lip 19a longer than the radially outer, side seal lip 18a as mentioned in the first example.

In addition, the outer diameter in the free state of the radially outer, side seal lip 18a is made smaller than the inner diameter of the cylindrical fitting portion 22 of the reinforcing metal 16b, so that packaging the seal rings 13 can be easily carried out for efficient shipping and transporting.

The axially outer surface (left side face in FIG. 4) of the support plate portion 23a of the reinforcing metal 16b of the seal ring 13 is generally covered by the seal member 17a, and the outer peripheral portion of the seal member 17a is held between the outer peripheral surface of the inclined portion 27 continued from the cylindrical fitting portion 22 and the inner peripheral surface of the open end portion of the outer ring 8. With this construction, the fitting portion between the reinforcing metal 16b and the outer ring 8 is sealed so as to prevent rain water etc. from reaching the reinforcing metal 16b. Accordingly, the reinforcing metal 16b can be made from inexpensive steel plate still keeping sufficient durability.

Figure 5:
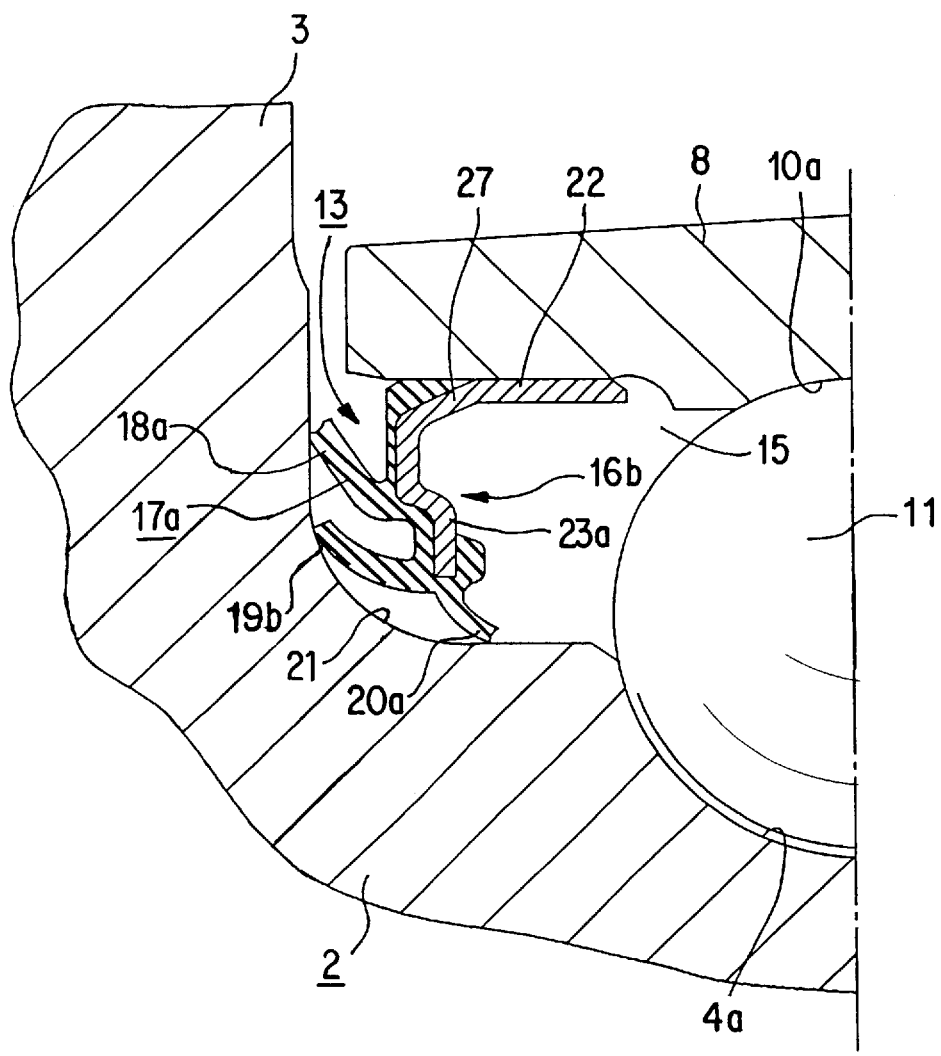
FIG. 5 is an enlarged view similar to FIG. 2 showing another embodiment of the present invention.
Figure 6:
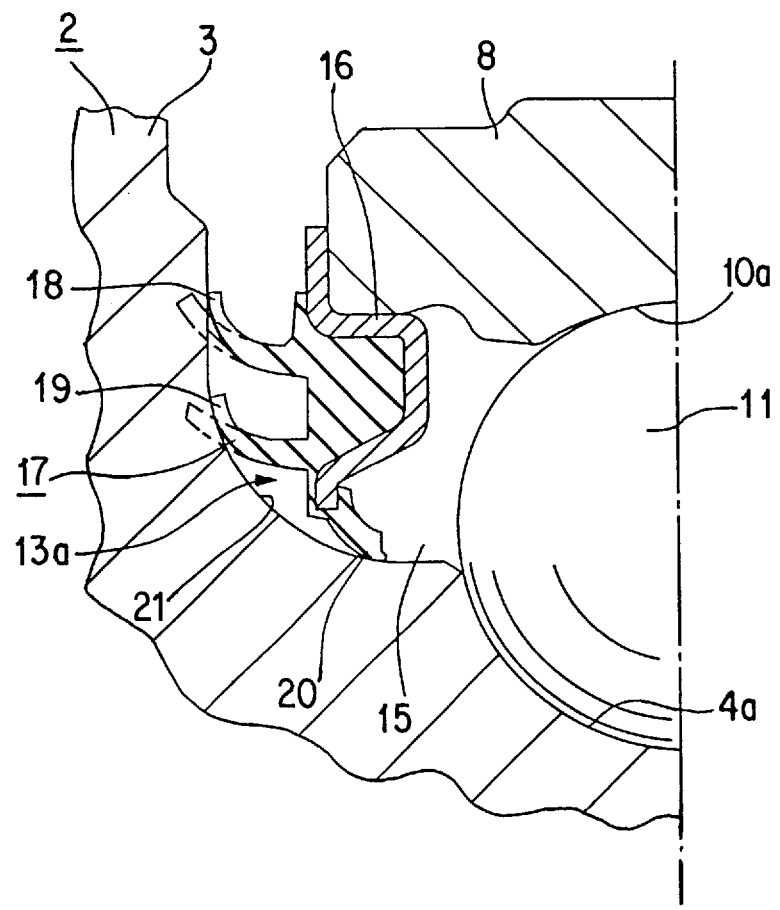
FIG. 6 is an enlarged view similar to FIG. 2 showing an example of conventional rolling bearing units.

FIG. 5 shows a third example of the present embodiment. This example meets the requirements (2) to (4), except for the requirement (1), as mentioned above.

The tip end edge of the radially inner, side seal lip 19b is slidably abutted to the curved surface portion 21, so that without increasing the axial (left and right directions in FIG. 5) and radial (upward and downward in FIG. 5) sizes of the rolling bearing unit with seal device, the radius of curvature of the curved surface portion 21 is increased to secure the rigidity and strength of the outward flange 3.

The thickness of the radially inner, side seal lip 19b is equal to that of the radially outer, side seal lip 18a, so that the torque is not lowered, which is different from the first and second examples. The outer constructions and functions are substantially the same to those of the first and second examples.

Consequently, in the rolling bearing unit with seal device of the present invention, the rotating torque is reduced as required and the rigidity and strength of the outward flange are secured without making the whole unit large in size.

What is claimed is:

1. A rolling bearing unit with seal device comprising, an outer ring member having an open end portion and an inner peripheral surface formed with outer ring raceways in double rows, an inner ring assembly having an outer peripheral surface comprising a first portion which is formed with inner ring raceways in double rows opposed to the outer ring raceways and a second portion projected from the open end portion of the outer ring member and formed with an outward flange, a plurality of rolling elements provided between the outer ring raceways and the inner ring raceways, respectively, and a seal ring provided to cover an annular space between the outer ring member and the inner ring assembly at the open end portion, the seal ring comprising a reinforcing metal, side seal lips on the radially outer and inner sides each extending radially outward and having a tip edge in sliding contact relation with a contact portion from a side face of the outward flange to a curved surface portion through which the side face is continued to the outer peripheral surface of the inner ring assembly, and a radial seal lip extending axially inward and having a tip edge in sliding contact relation with the outer peripheral surface of the inner ring assembly, and the rolling bearing unit with seal device satisfying at least one of the following conditions (1) and (2):

(1) the thickness of the side seal lip on the radially inner side is smaller than the thickness of the side seal lip on the radially outer side, and (2) the tip edge of the side seal lip on the radially inner side is placed in sliding contact relation with the curved surface portion.

2. The rolling bearing unit of claim 1, wherein the annular space is provided between the side face of the outward flange and the rolling elements opposed to the side face, the axial size of the annular space in which the seal ring 13 mounted in about 6.5 mm to about 9.5 mm, the radius of curvature in cross section of the curved surface portion is at least 3.0 mm, and the tip edge of the side seal lip on the radially outer side is slidingly abutted to a portion of the side face of the outward flange radially outer than the curved surface portion while the tip edge of the side seal lip on the radially inner side is slidingly abutted to the curved surface portion.

3. The rolling bearing unit with seal device of claim 2, wherein the thickness of the side seal lip on the radially inner side is smaller than that of the side seal lip on the radially outer side.

4. The rolling bearing unit of claim 3, wherein the rolling elements are balls, the axial size of the annular space is equal to an amount obtained by subtracting a half of the outer diameter of the rolling elements, from the distance between the portion of the side face of the outward flange to which the tip end edge of the side seal lip on the radially outer side is abutted and the center of the rolling elements opposed to the side face of the outward flange.

5. The rolling bearing unit of claim 2, wherein the rolling elements are balls, the axial size of the annular space is equal to an amount obtained by subtracting a half of the outer diameter of the rolling elements, from the distance between the portion of the side face of the outward flange to which the tip end edge of the side seal lip on the radially outer side is abutted and the center of the rolling elements opposed to the side face of the outward flange.

* * * * *